United States Patent
Babbar et al.

(10) Patent No.: US 9,049,096 B2
(45) Date of Patent: Jun. 2, 2015

(54) DATA ROUTING VIA LOWER LAYERS IN A COMMUNICATION SYSTEM

(75) Inventors: Uppinder S. Babbar, San Diego, CA (US); Ajith T. Payyappilly, San Diego, CA (US); Srinivas R. Mudireddy, San Diego, CA (US); Venkata Satish Kumar Vangala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 11/764,135

(22) Filed: Jun. 15, 2007

(65) Prior Publication Data

US 2008/0101356 A1     May 1, 2008

Related U.S. Application Data

(60) Provisional application No. 60/815,040, filed on Jun. 19, 2006.

(51) Int. Cl.
| | |
|---|---|
| *H04J 3/16* | (2006.01) |
| *H04J 3/22* | (2006.01) |
| *H04L 12/701* | (2013.01) |
| *H04L 12/707* | (2013.01) |
| *H04L 12/725* | (2013.01) |
| *H04L 12/801* | (2013.01) |

(Continued)

(52) U.S. Cl.
CPC ............ *H04L 45/00* (2013.01); *H04L 45/22* (2013.01); *H04L 45/306* (2013.01); *H04L 47/14* (2013.01); *H04W 28/24* (2013.01); *H04W 40/12* (2013.01); *H04L 69/14* (2013.01)

(58) Field of Classification Search
USPC .............. 370/352, 354, 355, 358, 395.43
See application file for complete search history.

(56) References Cited

U.S. PATENT DOCUMENTS

| | | | |
|---|---|---|---|
| 6,781,959 B1* | 8/2004 | Garakani et al. | 370/242 |
| 2001/0019554 A1* | 9/2001 | Nomura et al. | 370/389 |

(Continued)

FOREIGN PATENT DOCUMENTS

| | | |
|---|---|---|
| CN | 1520700 A | 8/2004 |
| EP | 1017207 | 7/2000 |

(Continued)

OTHER PUBLICATIONS

International Search Report—PCT/US07/071602, International Search Authority—European Patent Office—Nov. 30, 2007.

(Continued)

*Primary Examiner* — Jason Mattis
*Assistant Examiner* — Adnan Baig
(74) *Attorney, Agent, or Firm* — Michael J. DeHaemer, Jr.

(57) ABSTRACT

Techniques for routing data via lower layer paths through lower layers of a protocol stack are described. A lower layer path may be composed of a flow for packets, a link at a link layer, and a channel at a physical layer. A packet may be received from an application. A most preferred lower layer path for the packet may be selected from among at least one available lower layer path. The available lower layer path(s) may be arranged in an order of preference based on treatment of packets (e.g., best effort or QoS), protocols used at the link layer, channel types at the physical layer, and/or other factors. The packet may be sent via the selected lower layer path. A highest precedence lower layer path for the packet may be set up (e.g., in parallel) if this path is not among the at least one available lower layer path.

26 Claims, 9 Drawing Sheets

(51) Int. Cl.
*H04W 28/24* (2009.01)
*H04L 29/06* (2006.01)
*H04W 40/12* (2009.01)

(56) References Cited

U.S. PATENT DOCUMENTS

| | | | | |
|---|---|---|---|---|
| 2001/0043615 | A1* | 11/2001 | Park et al. | 370/474 |
| 2002/0147819 | A1 | 10/2002 | Miyakoshi et al. | |
| 2004/0215769 | A1 | 10/2004 | Yoshida et al. | |
| 2005/0011365 | A1* | 1/2005 | Lamy et al. | 99/326 |
| 2005/0157641 | A1* | 7/2005 | Roy | 370/218 |
| 2006/0083261 | A1* | 4/2006 | Maeda et al. | 370/465 |
| 2006/0193295 | A1* | 8/2006 | White et al. | 370/336 |
| 2006/0265474 | A1* | 11/2006 | Kim et al. | 709/218 |
| 2006/0291449 | A1* | 12/2006 | Babbar et al. | 370/352 |
| 2007/0140171 | A1* | 6/2007 | Balasubramanian | 370/331 |

FOREIGN PATENT DOCUMENTS

| | | |
|---|---|---|
| EP | 1443784 | 8/2004 |
| JP | H10271039 A | 10/1998 |
| JP | 2001517910 | 10/2001 |
| JP | 2002359623 A | 12/2002 |
| JP | 2003331327 A | 11/2003 |
| JP | 2004526392 A | 8/2004 |
| JP | 2004529533 A | 9/2004 |
| JP | 2004328319 A | 11/2004 |
| JP | 2005065335 A | 3/2005 |
| JP | 2005260904 A | 9/2005 |
| JP | 2009516689 A | 4/2009 |
| KR | 20000003289 | 1/2000 |
| KR | 20000043967 | 7/2000 |
| KR | 1020030088049 | 11/2003 |
| KR | 20040014551 | 2/2004 |
| WO | WO9916266 A1 | 4/1999 |
| WO | 2005109792 | 11/2005 |
| WO | WO 2005122497 A1 * | 12/2005 |
| WO | 2006046896 | 5/2006 |

OTHER PUBLICATIONS

International Preliminary Report on Patentability—PCT/US07/071602, International Search Authority—European Patent Office—Sep. 5, 2008.

Written Opinion—PCT/US07/071602, International Search Authority—European Patent Office—Nov. 30, 2007.

* cited by examiner

DATA ROUTING VIA LOWER LAYERS IN A COMMUNICATION SYSTEM

The present Application for Patent claims priority to Provisional Application No. 60/815,040 entitled "Routing Packets in CDMA EvDO Rev A System" filed Jun. 19, 2006, and assigned to the assignee hereof and hereby expressly incorporated by reference herein.

BACKGROUND

I. Field

The present disclosure relates generally to communication, and more specifically to techniques for routing data in a communication system.

II. Background

In a communication system, a terminal may exchange data with another terminal or a server using a protocol stack composed of various layers. Each layer may perform certain functions and provide a mechanism for transporting data from a layer immediately above. The transport mechanism for each layer may include one or more transport means, which may be referred to by different names in different layers. For example, the transport means for one layer may be referred to as "flows", the transport means for another layer may be referred to as "links", and the transport means for yet another layer may be referred to as "channels". The transport means for each layer may have different characteristics. For example, one flow may provide best effort delivery of data whereas another flow may deliver data with certain quality of service (QoS) guarantees.

In general, data may be sent by passing the data down the protocol stack, processing the data at each layer, and sending the processed data from the lowest layer in the protocol stack to a recipient entity. Good performance and proper treatment of the data may be achieved by mapping the data to an appropriate transport means (e.g., flow, link, or channel) having the desired characteristics at each layer as the data is passed down the protocol stack. This may then ensure that the data will be properly processed by each layer to achieve the desired performance for the data transmission.

Selecting an appropriate transport means at each layer may be challenging for several reasons. First, the transport means at each layer may have dynamically varying states, and each transport means may or may not be available at any given moment. Second, there may be restrictions on the mapping between the transport means at one layer to the transport means at another layer.

There is therefore a need in the art for techniques to route data through layers in the protocol stack in an efficient manner.

SUMMARY

Techniques for efficiently routing data via lower layer paths through lower layers of a protocol stack are described herein. A lower layer path is a path via which data may be sent through the lower layers (e.g., a link layer and a physical layer) in the protocol stack. A lower layer path may be composed of a flow for packets, a link at the link layer, and a channel at the physical layer. A number of lower layer paths may be possible for a terminal, and all or a subset of these lower layer paths may be available for use at any given moment depending on the states of the flows, links, and channels configured at the terminal.

In one design, a packet to be sent may be received, e.g., from an application. A most preferred lower layer path for the packet may be selected from among at least one available lower layer path. The available lower layer path(s) may be arranged in an order of preference based on treatment of packets (e.g., with a QoS flow having higher preference than a best effort flow), protocols used at the link layer, channel types at the physical layer, and/or other factors. A lower layer path with a QoS flow may be selected if such a path is specified for the packet and is available. A lower layer path with a best effort flow may be selected if the lower layer path with the QoS flow is not specified for the packet or is not available. In any case, the packet may be sent via the selected lower layer path. A highest precedence lower layer path for the packet may be set up if this path is not among the at least one available lower layer path.

Various aspects and features of the disclosure are described in further detail below.

DETAILED DESCRIPTION

The techniques described herein may be used for various communication systems and networks such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, local area networks (LANs), wireless LANs (WLANs), etc. The terms "network" and "system" are often used interchangeably. A CDMA system may implement a radio technology such as cdma2000, Universal Terrestrial Radio Access (UTRA), etc. cdma2000 covers IS-2000, IS-95 and IS-856 standards. UTRA includes Wideband-CDMA (W-CDMA) and Time Division-Synchronous CDMA (TD-SCDMA). A TDMA system may implement a radio technology such as Global System for Mobile Communications (GSM). An OFDMA system may implement a radio technology such as Evolved UTRA (E-UTRA), IEEE 802.11, IEEE 802.16, IEEE 802.20, Flash-OFDM®, etc. These various radio technologies and standards are known in the art. UTRA, E-UTRA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available.

For clarity, certain aspects of the techniques are described for a High Rate Packet Data (HRPD) system that implements IS-856. HRPD is also referred to as CDMA2000 1xEV-DO, 1xEV-DO, 1x-DO, DO, High Data Rate (HDR), etc.

Figure 1:
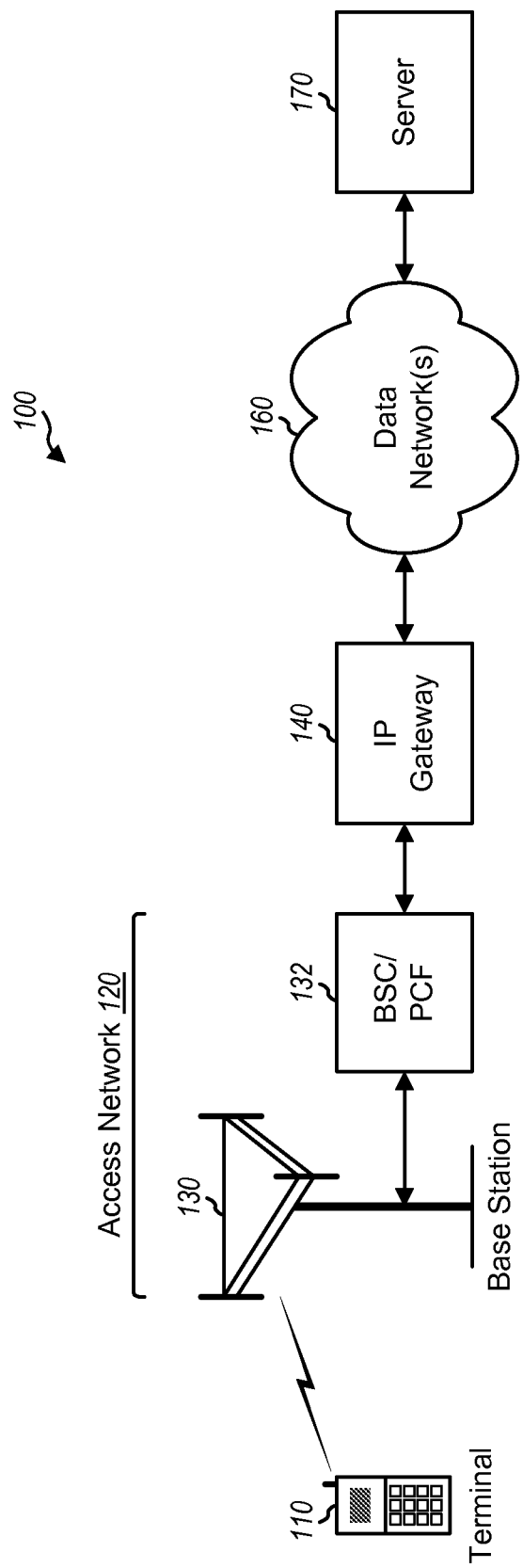
FIG. 1 shows a wireless communication system.

FIG. 1 shows a wireless communication system 100, which may be an HRPD system. Wireless system 100 includes (i) an access network 120 that supports radio communication for terminals and (ii) network entities that perform various functions to support communication services. Access network 120 may include any number of base stations 130 and any number of Base Station Controllers/Packet Control Functions (BSCs/PCFs) 132. A base station is generally a fixed station that communicates with the terminals and may also be referred to as an access point, a Node B, an evolved Node B (eNode B), etc. BSC/PCF 132 couples to a set of base stations, provides coordination and control for the base stations under its control, and routes data for these base stations.

An Internet Protocol (IP) gateway 140 supports data services for terminals communicating with access network 120 and may also be referred to as a Packet Data Serving Node (PDSN). IP gateway 140 may be responsible for establishment, maintenance, and termination of data sessions for terminals and may further assign dynamic IP addresses to the terminals. IP gateway 140 may communicate with other network entities to support the data services. IP gateways 140 may couple to data network(s) 160, which may comprise a core network, private data networks, public data networks, the Internet, etc. IP gateway 140 can communicate with various entities such as a server 170 via data network(s) 160. Wireless system 100 may include other network entities not shown in FIG. 1.

A terminal 110 may communicate with access network 120 to obtain various communication services supported by wireless system 100. Terminal 110 may also be referred to as a mobile station, a user equipment, a user terminal, a subscriber unit, a station, etc. Terminal 110 may be a cellular phone, a personal digital assistant (PDA), a wireless modem, a handheld device, a laptop computer, etc. Terminal 110 may communicate with access network 120 to exchange data with other entities such as server 170.

Figure 2:
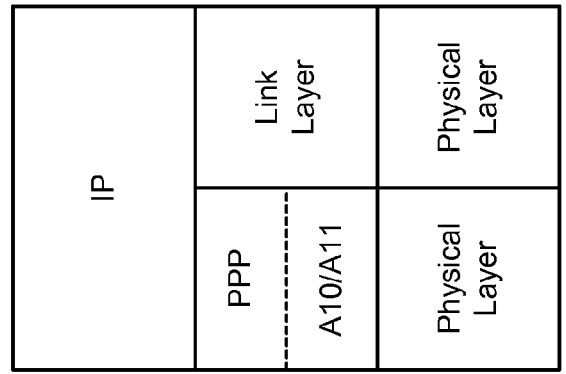
FIG. 2 shows example protocol stacks at various entities in FIG. 1
Figure 2:
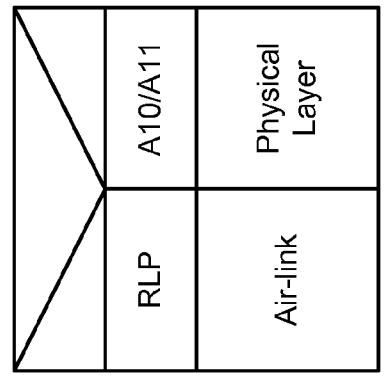
Figure 2:
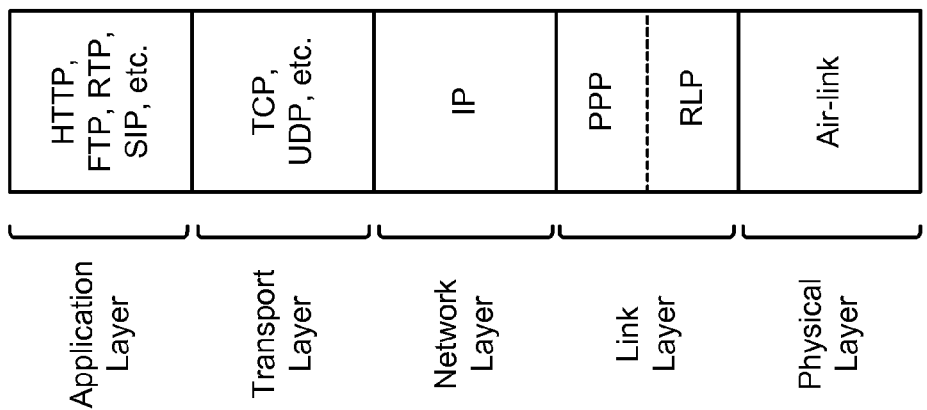

FIG. 2 shows example protocol stacks at various entities in FIG. 1 for communication between access terminal 110 and server 170. The protocol stack for each entity may include an application layer, a transport layer, a network layer, a link layer, and a physical layer.

Terminal 110 may communicate with server 170 using HyperText Transfer Protocol (HTTP), File Transfer Protocol (FTP), Real-time Transport Protocol (RTP), Session Initiation Protocol (SIP), and/or other protocols at the application layer. Application layer data may be sent using Transmission Control Protocol (TCP), User Datagram Protocol (UDP), and/or other protocols at the transport layer. These various protocols are known in the art. Transport layer data may be encapsulated in IP packets, which may be exchanged between terminal 110 and server 170 via access network 120, IP gateway 140, and possibly other entities.

The link layer between terminal 110 and access network 120 is typically dependent on the radio technology used by the access network. For HRPD, the link layer is implemented with Point-to-Point Protocol (PPP) over Radio Link Protocol (RLP). Terminal 110 may maintain a PPP session with IP gateway 140 and may exchange data with access network 120 via RLP. RLP operates on top of an radio or air-link interface, e.g., IS-856 for HRPD. Access network 120 may communicate with IP gateway 140 via a technology-dependent interface (e.g., A10 and A11 interfaces) that operates on top of a physical layer. A10 is a data interface and A11 is a signaling interface between PCF 134 and IP gateway 140. IP gateway 140 may communicate with server 170 via IP over a link layer and a physical layer.

Figure 3:
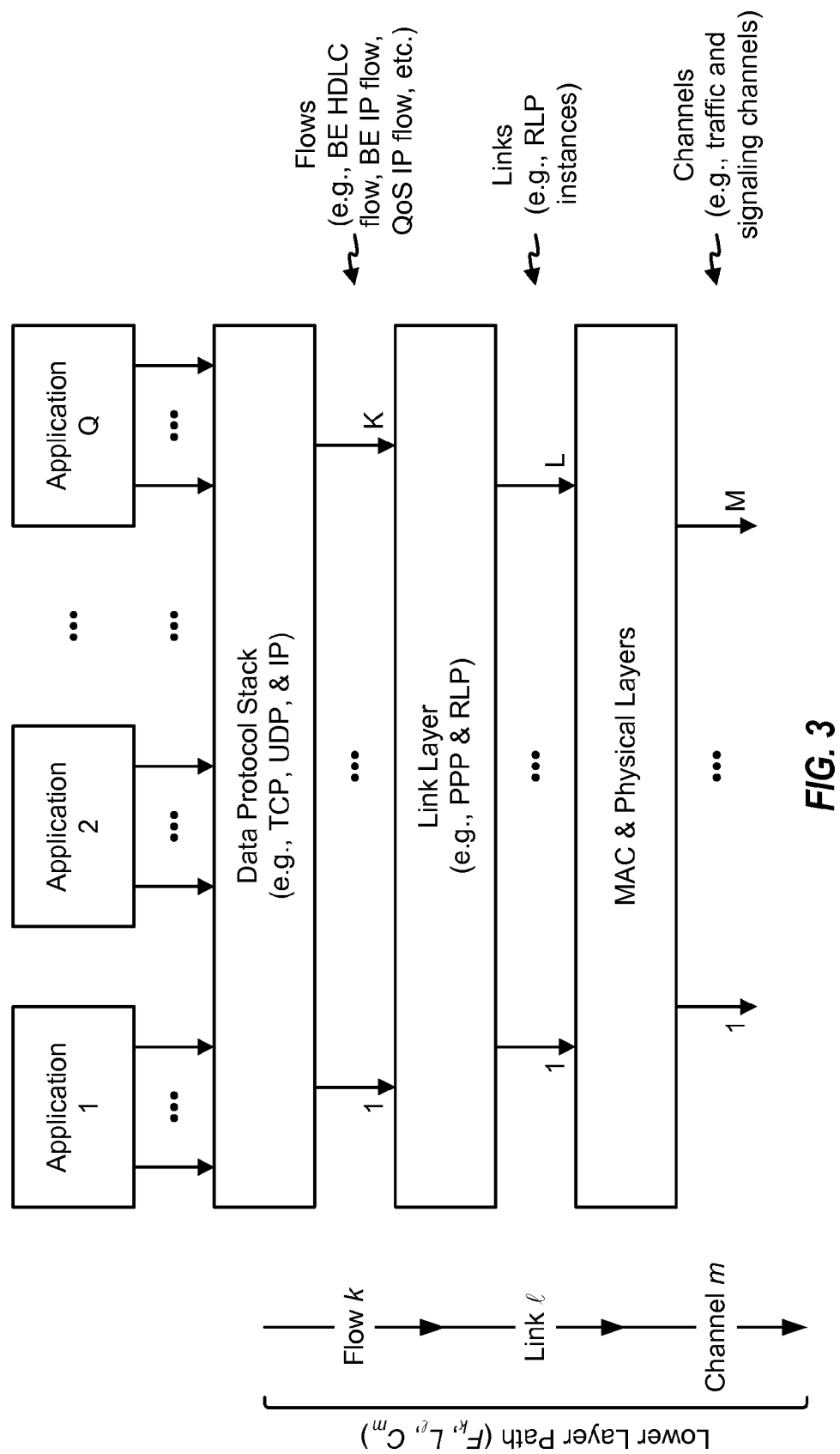
FIG. 3 shows processing for lower layers at a terminal.

FIG. 3 shows processing for lower layers at terminal 110. Terminal 110 may have Q active applications that may engage any communication services from wireless system 100, where $Q \geq 1$. The Q applications may be for Voice-over-IP (VoIP), video, video conferencing, Short Message Service (SMS), Instant Messaging (IM), push-to-talk (PTT), web browsing, etc. These Q applications may utilize HTTP, FTP, RTP, SIP, and/or other protocols at the application layer. The Q applications may have data that belongs in different classes such as conversational, streaming, interactive, and background. The data in different classes may be sent with different treatments, which may be quantified by best effort or QoS. For example, data for the interactive and background classes may be sent with best effort, and data for the conversation and streaming classes may be sent with certain QoS guarantees.

The data from the Q applications may be processed by a data protocol stack and mapped to K flows, where $K \geq 1$. The data protocol stack may implement TCP, UDP, IP and/or other protocols at the transport and network layers. A flow is a stream of packets matching one or more filtering criteria, which may be for port numbers, protocols, source and/or destination addresses, etc. The K flows may be processed by the link layer (e.g., for PPP, RLP and/or other protocols) and mapped to L links, where $L \geq 1$. A link is a transport means at the link layer and may bear specific characteristics (e.g., for data treatments) and/or may be associated with a specific link protocol (e.g., High-Level Data Link Control (HDLC), Robust Header Compression (ROHC), or Null). The L links may be processed by Medium Access Control (MAC) and physical layers and mapped to M channels, where $M \geq 1$. MAC may be considered part of the link layer but is shown with the physical layer in FIG. 3. A channel is a transport means at the physical layer and may be associated with certain characteristics, e.g., data rate.

The processing for the lower layers may be different in different radio technologies and systems. Furthermore, the transport means at each layer may be referred to by different terminology in different radio technologies and systems. For example, the links may be referred to as RLP instances in HRPD, logical channels in W-CDMA, etc. The channels may be referred to as traffic channels in HRPD, physical channels in W-CDMA, etc. For clarity, certain aspects of the techniques are specifically described below for HRPD.

HRPD supports flows with different characteristics. A flow may be either (i) a best effort flow that transports data with no specific QoS guarantees or (ii) a QoS flow that transports data with certain QoS guarantees. Different QoS flows may be defined with different QoS guarantees. A flow may also be associated with a flow protocol such as HDLC, Null/IP, or ROHC at the link layer. An HDLC flow transports data with HDLC framing (or HDLC protocol) at PPP. An IP flow transports data as raw IP packets with no framing (or Null protocol) at PPP, and with framing provided by RLP instead. A ROHC flow transports data as header compressed packets with ROHC framing (or ROHC protocol) at PPP or RLP. Different flows may be defined for (i) different data treatments such as best effort and/or QoS and (ii) different flow protocols such as HDLC, Null/IP, and ROHC. Each flow may be assigned a unique flow ID.

Table 1 lists some flows that may be established in HRPD and provides a flow ID and a short description for each flow. One best effort HDLC flow may be established to carry HDLC framed data with best effort and may be assigned a flow ID of 255. One best effort IP flow may be established to carry raw IP packets with best effort and may be assigned a flow ID of 254. In general, one best effort flow may be established for each protocol type. Up to 254 QoS flows may be established in HRPD for all protocol types and may be assigned flow IDs of 0 to 253.

TABLE 1

| Flow | Flow ID | Bound Link | Description |
| --- | --- | --- | --- |
| Best effort HDLC flow | 255 | Primary link | Flow transporting data with best effort using HDLC framing. |
| Best effort IP flow | 254 | Secondary link | Flow transporting data as raw IP packets with best effort and framing provided by RLP. |
| QoS IP flow | 0 to 253 | Primary or secondary link | Flow transporting data with specific QoS guarantees. |

HRPD supports two types of link (or RLP instance)—primary link and secondary link. One primary link may be established as part of initial data session setup and IP address assignment. The primary link may be used to carry best effort and QoS HDLC flows. Up to L-1 secondary links may be established and used to carry other flows that are not sent on the primary link. The secondary links may be established on demand instead of during initial data session setup. Each link may be configured with a specific protocol (e.g., HDLC, Null/IP, ROHC, etc.) and may carry one or more flows of that same protocol. For example, a link configured for HDLC may carry best effort and QoS HDLC flows but not IP flows or ROHC flows.

Table 2 lists the two types of link in HRPD and provides a short description for each type of link.

TABLE 2

| Link | Number of links | Description |
| --- | --- | --- |
| Primary link | 1 | Default link established during data session setup and carrying best effort and QoS HDLC flows. |
| Secondary link | 0 to L-1 | Link established on demand for a specific protocol and carrying flows of that same protocol and not sent on the primary link. |

HRPD supports two types of channel—traffic channel and signaling channel. A traffic channel may be set up when and as needed to carry data and may be brought down when not needed in order to conserve radio resources. The data rate of the traffic channel may be configured based on the data requirements, the availability of radio resources, and/or other factors. In HRPD, one traffic channel may be available for a given direction (e.g., forward or reverse direction) and used for all links in that direction. In general, depending on the system, up to L traffic channels may be available at any given moment, e.g., one traffic channel for all links, one traffic channel per link, etc. There may be a many-to-one mapping or a one-to-one mapping between links and traffic channels. In any case, each link may be bound to a specific traffic channel.

A signaling channel is a low data rate channel that may be available at all times. In HRPD, one signaling channel may be available for a given direction and may be used to send signaling for all links in that direction. Low volume and small packet sized data may also be sent on the signaling channel in order to avoid setting up a traffic channel to send the data. The signaling channel may thus carry data originally bound to the corresponding traffic channel. In general, depending on the system, up to L signaling channels may be available at any given moment, e.g., one signaling channel for all links, one signaling channel per link, etc. There may be a many-to-one mapping or a one-to-one mapping between links and signaling channels. In any case, each link may be bound to a specific signaling channel.

Table 3 lists the two types of channel and provides a short description for each type of channel. The number of traffic channels and the number of signaling channels may be dependent on the system, as described above.

TABLE 3

| Channel | Number of channels | Description |
| --- | --- | --- |
| Traffic channel | 0 to L | Channel that is set up on demand to carry data for an associated link. |
| Signaling channel | 0 to L | Channel that can carry low volume data for an associated link. |

The flows may carry data streams from the Q applications, which may be for SIP, RTP, etc. Each data stream may be mapped to a suitable flow, and each flow may carry any number of data streams. For example, terminal 110 may have one or two flows to carry RTP and SIP streams for a VoIP application and may have another best effort flow to carry a data stream for a browser application. Each flow may carry packets that match one or more packet filters in a traffic filter template (TFT). A packet filter may identify packets based on IP address, TCP/UDP port number, etc.

In HRPD, QoS may be granted for RLP instances (or links). The desired QoS for a given RLP instance may be specified by a set of QoS parameters, which is referred to as a QoS profile. The Q applications may have certain QoS requirements. Terminal 110 may determine one or more QoS profiles that can satisfy the QoS requirements of all of the applications. One or more RLP instances may be established for the one or more QoS profiles, one RLP instance for each QoS profile. Each flow may then be mapped to an RLP instance that can satisfy the QoS requirements (if any) for that flow. Each RLP instance may carry any number of flows whose QoS requirements can be satisfied by the QoS profile granted for that RLP instance.

For HRPD, each flow may be mapped to a specific link (or RLP instance), and each link may carry one or more flows. Each link may be bound to a specific traffic channel and a specific signaling channel.

A lower layer path is a path via which data may be sent through the lower layers, e.g., the link and physical layers. A lower layer path may be composed of a specific flow, a specific link, and a specific channel, as illustrated in FIG. 3. A terminal may have K flows, L links, and M channels, where $K \geq 1$, $L \geq 1$, and $M \geq 1$. If each flow may be mapped to any link and if each link may be sent on any channel, then up to $K \times L \times M$ different lower layer paths may be formed with the K flows, L links, and M channels. However, if each flow may be mapped to any link but if each link is sent on a specific channel, then up to $K \times L$ different lower layer paths may be formed with the K flows and L links. Fewer than $K \times L$ different lower layer paths may be possible if there are restrictions on the mapping of flows to links, e.g., due to data treatment, flow protocols, etc. A lower layer path is also referred to as simply a "path" in the description herein.

Not all possible paths may be available for use at any given moment. For example, a given path may not be available if the flow is not activated, if the link is not connected, or if the channel is brought down. The available paths may have different characteristics, e.g., different data treatments, different flow protocols, different data rates, etc. It is desirable to select the most suitable path to send each packet, where suitability may be quantified by data treatment, flow protocol, data rate, etc.

The paths may be assigned different preferences, where the preference for a given path may be indicative of the desirability of using that path to send a particular packet. For a given path composed of a flow, a link, and a channel, the preference of this path may be determined based on the data treatment by the flow, the protocol used for the link, and the type of channel used to send the data.

The preferences of the paths may be dependent on the data treatments by the flows. QoS flows may be configured to provide specific QoS guarantees and may thus be preferred over best effort flows that do not provide any QoS guarantees. Different QoS flows may be configured with different QoS guarantees. An appropriate QoS flow may be selected for a packet based on the QoS requirements of the packet and the QoS guarantees of the available QoS flows. If a QoS flow is not available, then the best effort flows may be considered for the packet.

The best effort flows may have different preferences, which may be determined based on various factors such as protocol overhead, CPU/processing efficiency (or computation intensity), etc. For example, a best effort IP flow may be preferred over a best effort HDLC flow since an IP flow may have less overhead than an HDLC flow and may also be more CPU efficient since RLP framing may be simpler than HDLC framing. A ROHC flow or some other flow with Header Compression enabled may have less protocol overhead than a similar flow without Header Compression Enabled, due to header compression, but may be more CPU intensive. Hence, a ROHC flow may be more suitable for applications (e.g., telnet, text messaging, real time applications such as VoIP, etc.) sending small packets in order to reduce header overhead.

An application may know the characteristics of the data generated by that application and may provide information to assist with routing through the lower layers. The application may provide flow treatment parameters that may be used to make better routing decisions. The application may also install one or more TFTs to bind its data to an appropriate best effort flow. The TFTs used to bind packets to specific best effort flows (or best effort TFTs) may be different from the TFTs used to bind packets to specific QoS flows (or QoS TFTs). The format and/or semantics of the best effort TFTs may be the same as, or different from, those of the QoS TFTs. The QoS TFTs may be binary in nature so that a packet matching a given QoS TFT may be mapped to the QoS flow associated with that TFT. Packets not matching the QoS TFTs may be sent on best effort flows. However, best effort TFTs may be considered as hints instead of directives. For example, if a packet matches a given best effort TFT but the associated best effort flow is not available for any reason, then the packet may still be sent on some other best effort flow. A given packet may thus be sent on any one of several possible best effort flows because (i) there are no resource reservations with the best effort flows and (ii) the only difference between the various best effort flows may be the configuration such as protocol, link framing, etc., used for these flows.

Each flow may be bound to a specific link. In this case, once a flow is selected, the link is also selected implicitly. Each link may be associated with a specific traffic channel and a specific signaling channel. Once a flow is selected, the link is known, and either the traffic channel or the signaling channel for that link may be used to send data.

The traffic channel may be preferred over the signaling channel and may be selected for use if it is available. If the traffic channel is not available, then the signaling channel may be used, if appropriate, instead of waiting to bring up the traffic channel or sending the data on a less preferred flow. However, it may be appropriate to send only low volume data, or small packets, or packets with low latency requirements on the signaling channel. An application may know its data characteristics and may provide this information as part of the flow treatment parameters. If the traffic channel is not available and data cannot be sent on the signaling channel, then the next preferred flow may be considered to send the data.

In one design, the following order of preference may be defined based on the considerations described above:
1. QoS flow over a traffic channel,
2. QoS flow over a signaling channel,
3. Most preferred best effort flow (e.g., best effort IP flow) over a traffic channel,
4. Most preferred best effort flow over a signaling channel,
5. Second most preferred best effort flow (e.g., best effort ROHC flow with RLP framing) over a traffic channel,
6. Second most preferred best effort flow over a signaling channel, and
7. Third most preferred best effort flow (e.g., best effort HDLC flow) over a traffic channel,
8. Third most preferred best effort flow over a signaling channel,
9. Fourth most preferred best effort flow (e.g., best effort ROHC flow with HDLC framing) over a traffic channel,
10. Fourth most preferred best effort flow over a signaling channel, and
11. Other combinations of flows and channels.

A packet may be sent via the highest precedence path (or the most preferred path) for the packet if this path is available. If the highest precedence path is not available, then the packet may be sent via the most preferred path among all paths that are available and appropriate for the packet. The paths may be considered one at a time, starting with the most preferred path, until a suitable path is identified for the packet.

If the highest precedence path is not available, then the packet may still be sent via a path of lower preference. The highest precedence path may be set up in parallel, if appropriate, so that subsequent packets may be sent via this path. Path setup may entail activating a flow if it is suspended, connecting a link if it is down, bringing up a traffic channel if it is not available, or any combination of these actions. Depending on the setup time, more than one packet may be sent via a less preferred path before the highest precedence path can be set up.

A decision on whether or not to attempt to set up the highest precedence path may be made based on various factors. Setting up the highest precedence path may be expensive, especially if setup is attempted on every packet sent via a less preferred path and the setup attempts continue to fail. In this case, the setup attempts may be throttled so that setup is attempted at periodic intervals. The setup attempts may also be controlled by the applications via the flow treatment parameters. For example, if an application knows that it is sending one or few packets, then there may be little advantages in setting up the highest precedence path. In this case, the one or few packets may be sent via a less preferred path without attempting to set up the highest precedence path.

An application may also indicate its preference on how its data may be sent, e.g., using the flow treatment parameters. For example, a VoIP application may prefer to send VoIP packets on a QoS flow. If the QoS flow is suspended, then the VoIP application may prefer to drop packets instead of sending them on a best effort flow without any QoS guarantees. As another example, a signaling (e.g., SIP) application may prefer to send a signaling message (e.g., to terminate a VoIP call) on a QoS flow if available or on a best effort flow if the QoS flow is not available, instead of waiting for the QoS flow to be activated.

For clarity, a specific design for selecting a path for a packet is described below. This design assumes the flows, links, and channels described above for HRPD.

A flow may have one of the following states:

Null—the flow is not established and cannot be used to send data,

Activated—the flow is set up and turned on and may be used to send data, e.g., resource reservations are available and QoS (if any) is guaranteed, or Suspended—the flow is set up but not turned on and cannot be used to send data, e.g., resource reservations are missing and/or QoS is set up but not guaranteed.

A link may have one of the following states:

Null—the link is not configured and cannot be used to carry data,

Connected—the link is configured and activated and may be used to send data, e.g., a traffic channel is available, or Not connected—the link is configured but not activated, e.g., a traffic channel is not available.

A link may be associated with a traffic channel and a signaling channel. The traffic channel may be brought up as needed and taken down when not needed. The signaling channel may be available at all times and may be used to send small amounts of data. The link is not connected if the traffic channel is not available but may nevertheless be used to send data using the signaling channel.

Figure 4:
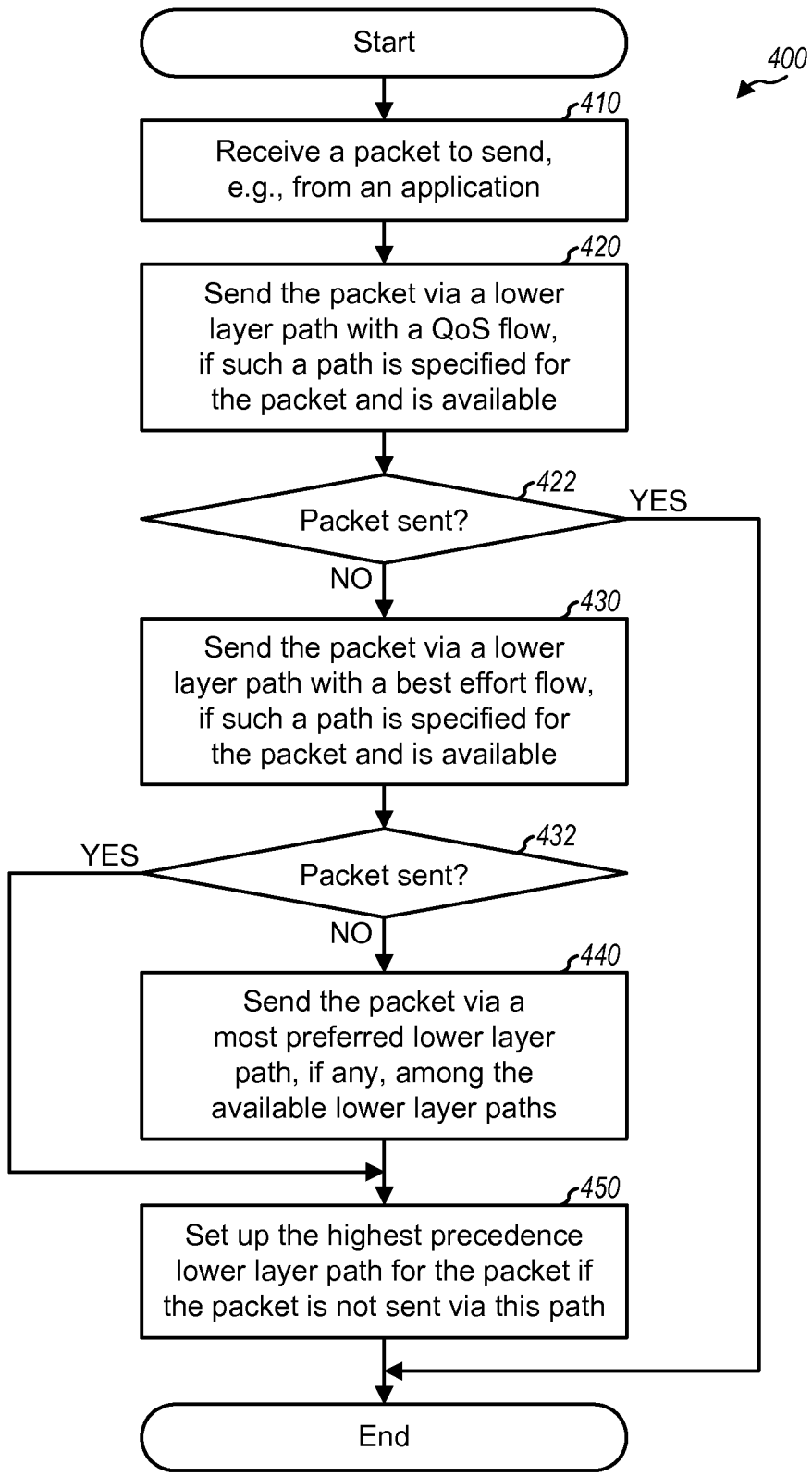
FIG. 4 shows a process for sending a packet via a most preferred path.

FIG. 4 shows a design of a process 400 for sending a packet via a most preferred path. Initially, the packet may be received from an application (block 410). The packet may be sent via a path with a QoS flow, if this QoS path is specified for the packet and is available (block 420). If the packet is sent in block 420, as determined in block 422, then the process terminates. The packet may not be sent in block 420 if no QoS path is specified for the packet or if the QoS path is specified but the packet could not be sent via this path for any reason. In this case, the packet may be sent via a path with a best effort flow, if this best effort path is specified for the packet and is available (block 430). If the packet is sent in block 430, as determined in block 432, then the process proceeds to block 450.

The packet may not be sent in block 430 if no best effort path is specified for the packet or if the best effort path is specified but the packet could not be sent via this path for any reason. In this case, the packet may be sent via a most preferred path, if any, among the available paths (block 440). The highest precedence path for the packet may be set up if the packet is not sent via this path (block 450). Block 450 may be performed even if the packet is not sent via any path. Blocks 420, 430 and 440 may be performed as described below.

Figure 5A:
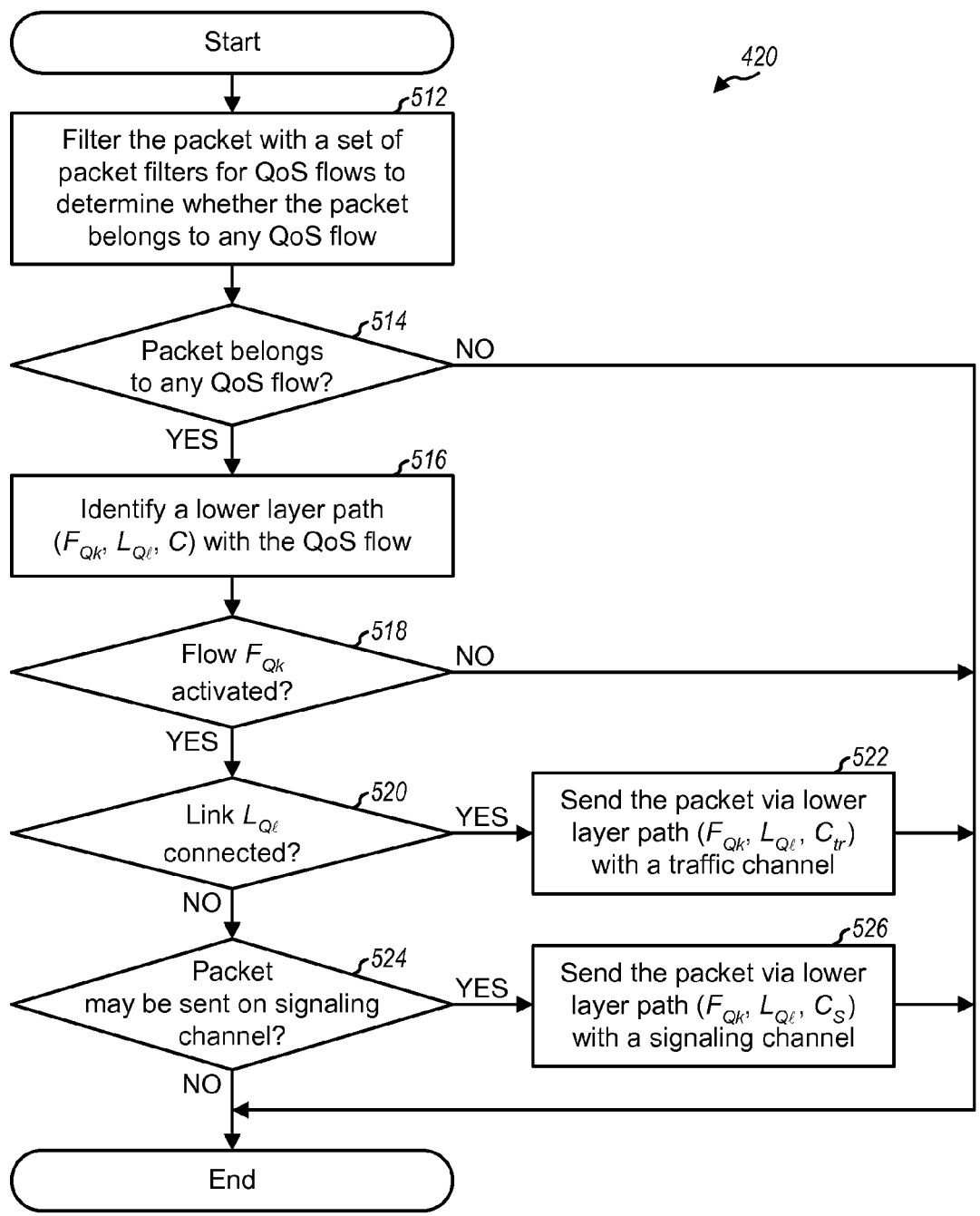
FIG. 5A shows a process for selecting a path with a QoS flow.

FIG. 5A shows a design of a process for block 420 in FIG. 4. The packet may be filtered with a set of packet filters for QoS flows in order to determine whether the packet belongs to any QoS flow (block 512). If the packet matches any packet filter and belongs to a QoS flow, as determined in block 514, then a path ($F_{Qk}$, $L_{Ql}$ C) with this QoS flow may be identified (block 516). This path may be composed of QoS flow $F_{Qk}$ with the appropriate QoS guarantees mapped to link $L_{Ql}$ sent on channel C. A determination may then be made whether flow $F_{Qk}$ is activated (block 518). If flow $F_{Qk}$ is activated, then a determination may be made whether link $L_{Ql}$ is connected (block 520). If flow $F_{Qk}$ is activated and link $L_{Ql}$ is connected, then the packet may be sent on flow $F_{Qk}$, link $L_{Ql}$, and traffic channel $C_{tr}$, or via path ($F_{Qk}$, $L_{Ql}$ $C_{tr}$), which is capable of providing the most desirable QoS (block 522).

If flow $F_{Qk}$ is activated but link $L_{Ql}$ is not connected, then a determination may be made whether the packet can be sent on the signaling channel for link $L_{Ql}$ (524). The decision in block 524 may be dependent on various factors such as the application policy, the size of the packet, the characteristics and/or data rate of the signaling channel, etc. If the answer is 'Yes' for block 524, then the packet may be sent on flow $F_{Qk}$, link $L_{Ql}$, and signaling channel $C_s$, or via path ($F_{Qk}$, $L_{Ql}$ $C_S$) (block 526). If the packet does not match any packet filter in block 514, or if flow $F_{Qk}$ is suspended in block 518, or if link $L_{Ql}$ is not connected and the packet cannot be sent on the signaling channel in block 524, then the packet is not sent in block 420.

Figure 5B:
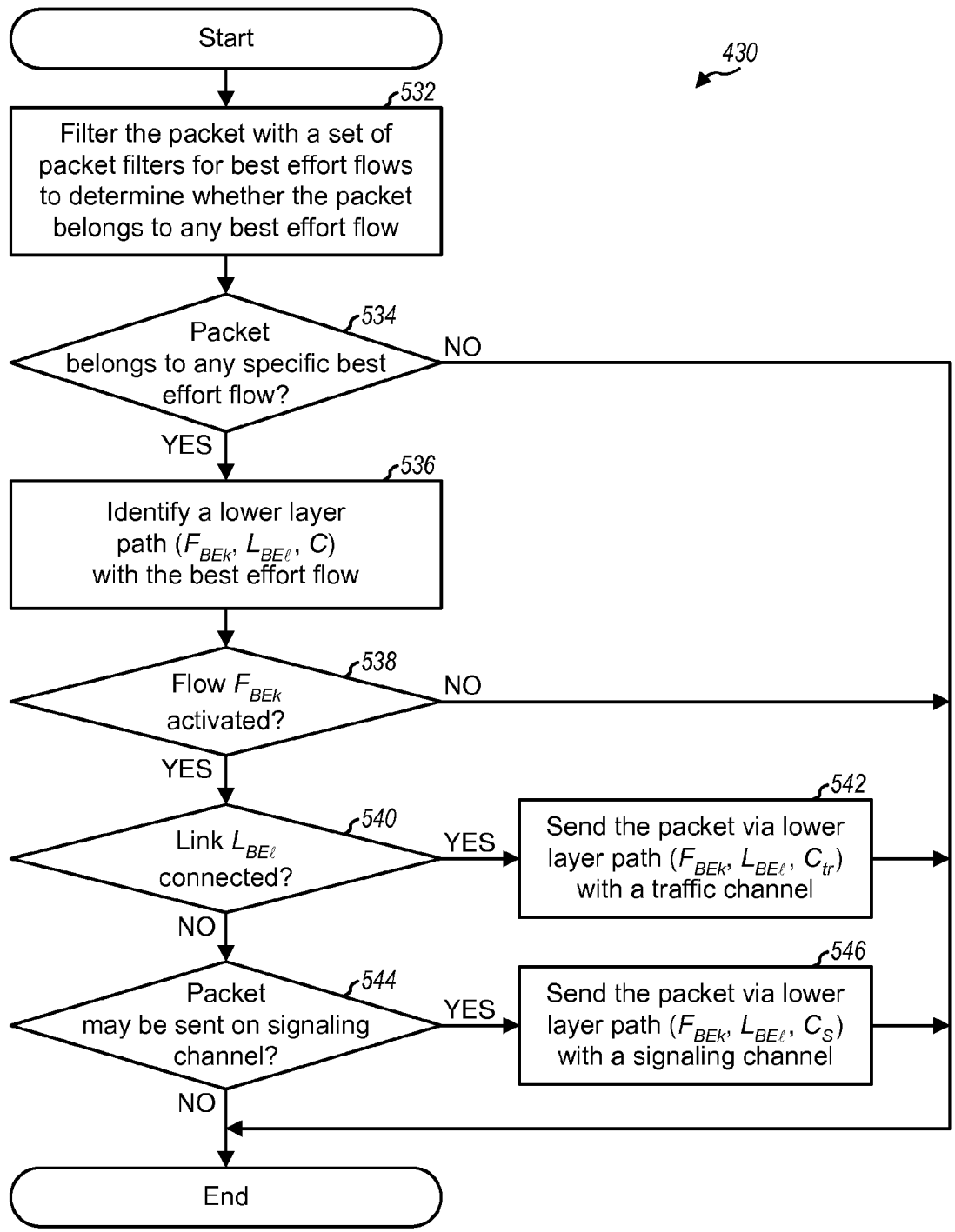
FIG. 5B shows a process for selecting a path with a best effort flow.

FIG. 5B shows a design of a process for block 430 in FIG. 4. The packet may be filtered with a set of packet filters for best effort flows in order to determine whether the packet belongs to any best effort flow (block 532). If the packet matches any packet filter and belongs to a specific best effort flow, as determined in block 534, then a path ($F_{BEk}$, $L_{BEl}$, C) with this best effort flow may be identified (block 536). This path may be composed of best effort flow $F_{BEk}$ mapped to link $L_{BEl}$ sent on channel C. A determination may then be made whether flow $F_{BEk}$ is activated (block 538). If flow $F_{BEk}$ is activated, then a determination may be made whether link $L_{BEl}$ is connected (block 540). If flow $F_{BEk}$ is activated and link $L_{BEl}$ is connected, then the packet may be sent on flow $F_{BEk}$, link $L_{BEl}$, and traffic channel $C_{tr}$, or via path ($F_{BEk}$, $L_{BEl}$, $C_{tr}$), which is specified as the most preferred best effort path for this packet (block 542).

If flow $F_{BEk}$ is activated but link $L_{BEl}$ is not connected, then a determination may be made whether the packet can be sent on the signaling channel for link $L_{BEl}$ (544). If the answer is 'Yes', then the packet may be sent on flow $F_{BEk}$, link $L_{BEl}$, and signaling channel $C_S$, or via path ($F_{BEk}$, $L_{BEl}$, $C_S$) (block 546). If the packet does not match any packet filter in block 534, or if flow $F_{BEk}$ is suspended in block 538, or if link $L_{BEl}$ is not connected and the packet cannot be sent on the signaling channel in block 544, then the packet is not sent in block 430.

Figure 5C:
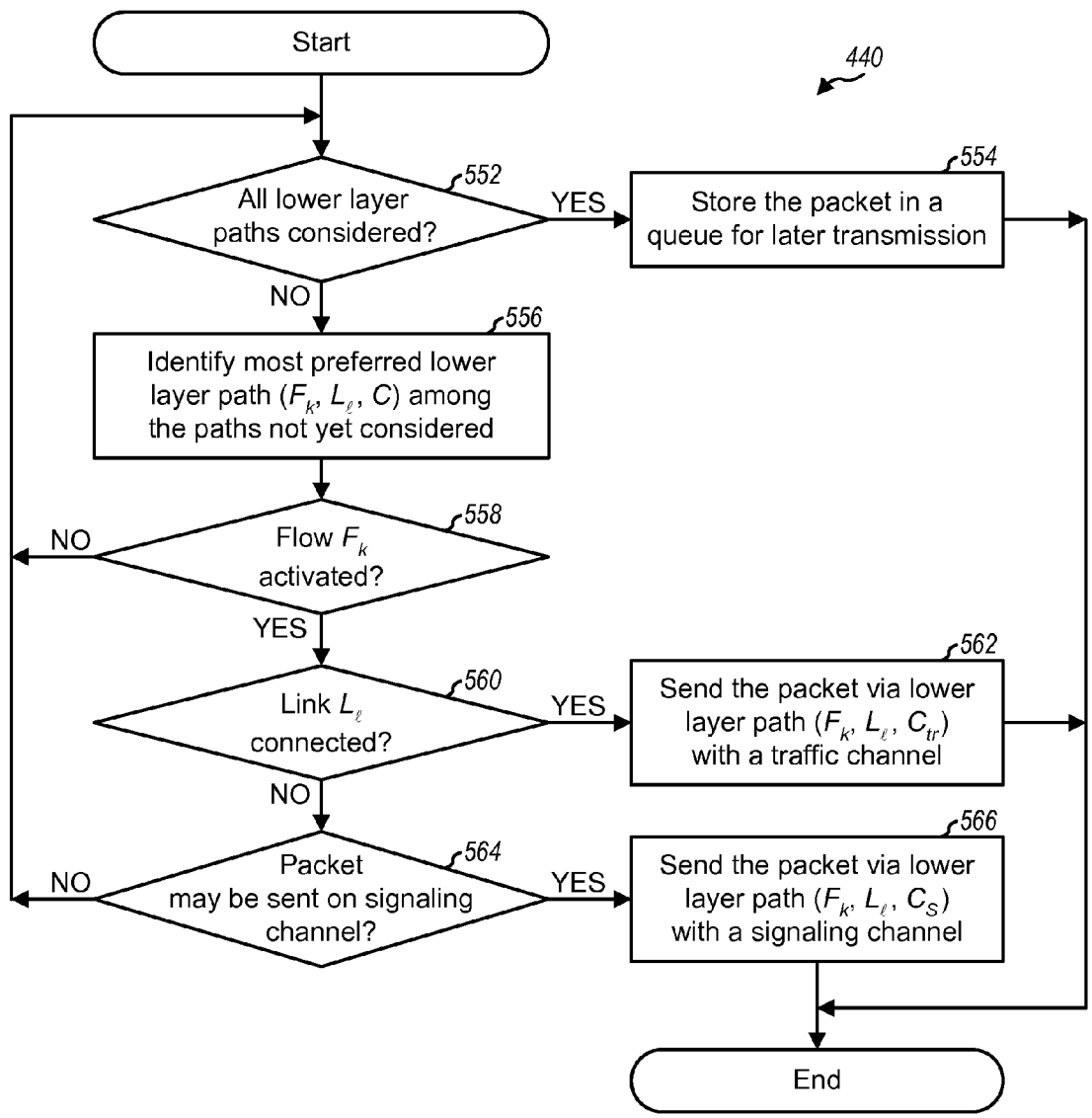
FIG. 5C shows a process for selecting a preferred path.

FIG. 5C shows a design of a process for block 440 in FIG. 4. A determination may be made initially whether there are any paths not yet considered for the packet (block 552). If all paths have been considered, then the packet may be stored in a queue for later transmission (block 554), and the process terminates. Otherwise, the most preferred path ($F_k$, $L_l$, C) among all paths not yet considered may be identified (block 556). The packet may have a particular order of preference for the paths. For example, the order of preference may include (i) a path with a best effort flow using the same protocol as the QoS flow, if any, specified for the packet, (ii) a path with a best effort ROHC flow, (iii) a path with a best effort IP flow, (iv) a path with a best effort HDLC flow, (v) etc. In general, the preference order may be dependent on various factors such as application policy, system defined preferences of flow protocols, etc.

A determination may be made whether flow $F_k$ is activated (block 558). If flow $F_k$ is activated, then a determination may be made whether link $L_l$ is connected (block 560). If flow $F_k$ is activated and link $L_l$ is connected, then the packet may be sent on flow $F_k$, link $L_l$, and traffic channel $C_{tr}$, or via path ($F_k$, $L_l$, $C_{tr}$), which is the most preferred path for this packet among all available paths based on the preference order (block 562). If flow $F_k$ is activated but link $L_l$ is not connected, then a determination may be made whether the packet can be sent on the signaling channel for link $L_l$ (564). If the answer is 'Yes', then the packet may be sent on flow $F_k$, link $L_l$, and signaling channel $C_S$, or via path ($F_k$, $L_l$, $C_S$) (block 566). If flow $F_k$ is suspended in block 558 or if link $L_l$ is not connected and the packet cannot be sent on the signaling channel in block 564, then the process returns to block 552 to attempt to identify another path for the packet.

Figure 6:
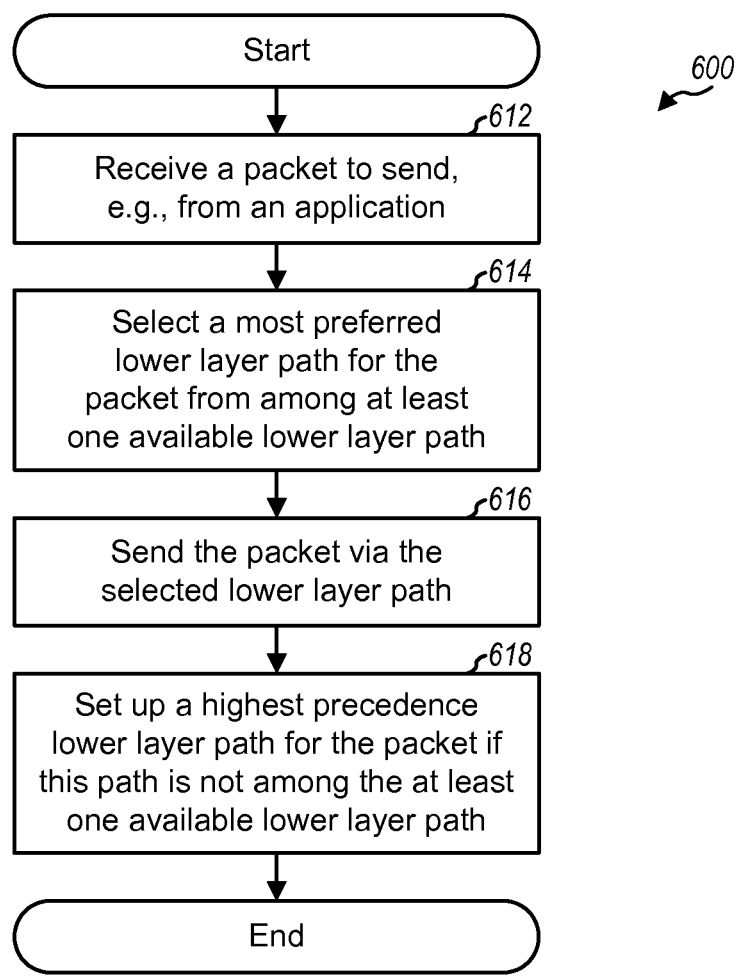
FIG. 6 shows a process for performing path routing for lower layers.

FIG. 6 shows a process 600 for performing path routing for lower layers. A packet to be sent to another entity may be received (block 612). A most preferred lower layer path for the packet may be selected from among at least one available lower layer path (block 614). The packet may be sent via the selected lower layer path (block 616). A highest precedence lower layer path for the packet may be set up if this path is not among the at least one available lower layer path (block 618).

Each available lower layer path may carry data through a link layer and a physical layer and may comprise a flow for packets matching at least one criterion, a link (e.g., an RLP instance in HRPD) at the link layer, and a channel at the physical layer. The available lower layer path(s) may be arranged in an order of preference based on (i) treatment of packets, e.g., with a QoS flow having higher preference than a best effort flow, (ii) configuration such as protocols (e.g., HDLC, Null/IP, ROHC, etc.) used at the link layer, (iii) channel types (e.g., traffic and signaling channels) at the physical layer, and/or (iv) other factors.

For block 614, a lower layer path with a QoS flow may be selected if such a path is specified for the packet and is available. A lower layer path with a best effort flow may be selected if the lower layer path with the QoS flow is not specified for the packet or is not available. For example, the packet may be filtered with at least one packet filter for at least one QoS flow. If the packet matches a packet filter for a QoS flow, then the lower layer path with this QoS flow may be selected as the most preferred lower layer path for the packet. The packet may be sent (i) on a traffic channel if the QoS flow is activated and the link for the selected lower layer path is connected or (ii) on a signaling channel if the QoS flow is activated, the link is not connected, and the signaling channel is available and capable of carrying the packet, e.g., as shown in FIG. 5A.

The packet may also be filtered with at least one packet filter for at least one best effort flow. If the packet matches a packet filter for a best effort flow, then the lower layer path with this best effort flow may be selected as the most preferred lower layer path for the packet. The packet may be sent (i) on a traffic channel if the best effort flow is activated and the link for the selected lower layer path is connected or (ii) on a signaling channel if the best effort flow is activated, the link is not connected, and the signaling channel is available and capable of carrying the packet, e.g., as shown in FIG. 5B.

For clarity, certain aspects of the techniques have been described specifically for HRPD and for a lower layer path composed of a flow, a link (or RLP instance), and a channel. The techniques may also be used for other wireless communication systems and radio technologies. Different systems and radio technologies may have different types of channels, different policies and rules on sending data on these channels, etc. For example, the following are some technology-specific characteristics and behavior:

- IEEE 802.11 does not support sending data over signaling channels and also supports a single link to which all flows are bound.
- Some UMTS radio technologies (e.g., EDGE, GPRS, W-CDMA, etc.) use Short Message Service (SMS) to send data over signaling channels.
- GPRS and W-CDMA can configure multiple compression protocols on the same secondary link.
- CDMA2000 1X uses Short Data Burst (SDB) to send packets on signaling channels.
- HRPD uses one RLP instance per link and a single traffic channel for all links. Hence, if the traffic channel is down, then all of the links will also be in down. This characteristic may be used to simplify the routing algorithm.

In general, the lower layer paths may be defined in different manners for different radio technologies and systems. The lower layer paths may include entities below data link layer such as MAC flows, logical channels, etc. For any given radio technology or system, there may be a particular order of preference for the available paths. A routing procedure at a terminal may take into account the specific characteristics of the radio technology being supported in order to select the most preferred lower layer path for each packet.

The techniques described herein select suitable lower layer paths for packets in order to achieve good performance. These techniques perform routing through lower layers (e.g., the link and physical layers) and find a suitable lower layer path to the next hop node (e.g., a base station) for each packet. The techniques solve a different problem than standard IP routing, which finds suitable communication routes to send packets to different devices/stations with different IP addresses.

Figure 7:
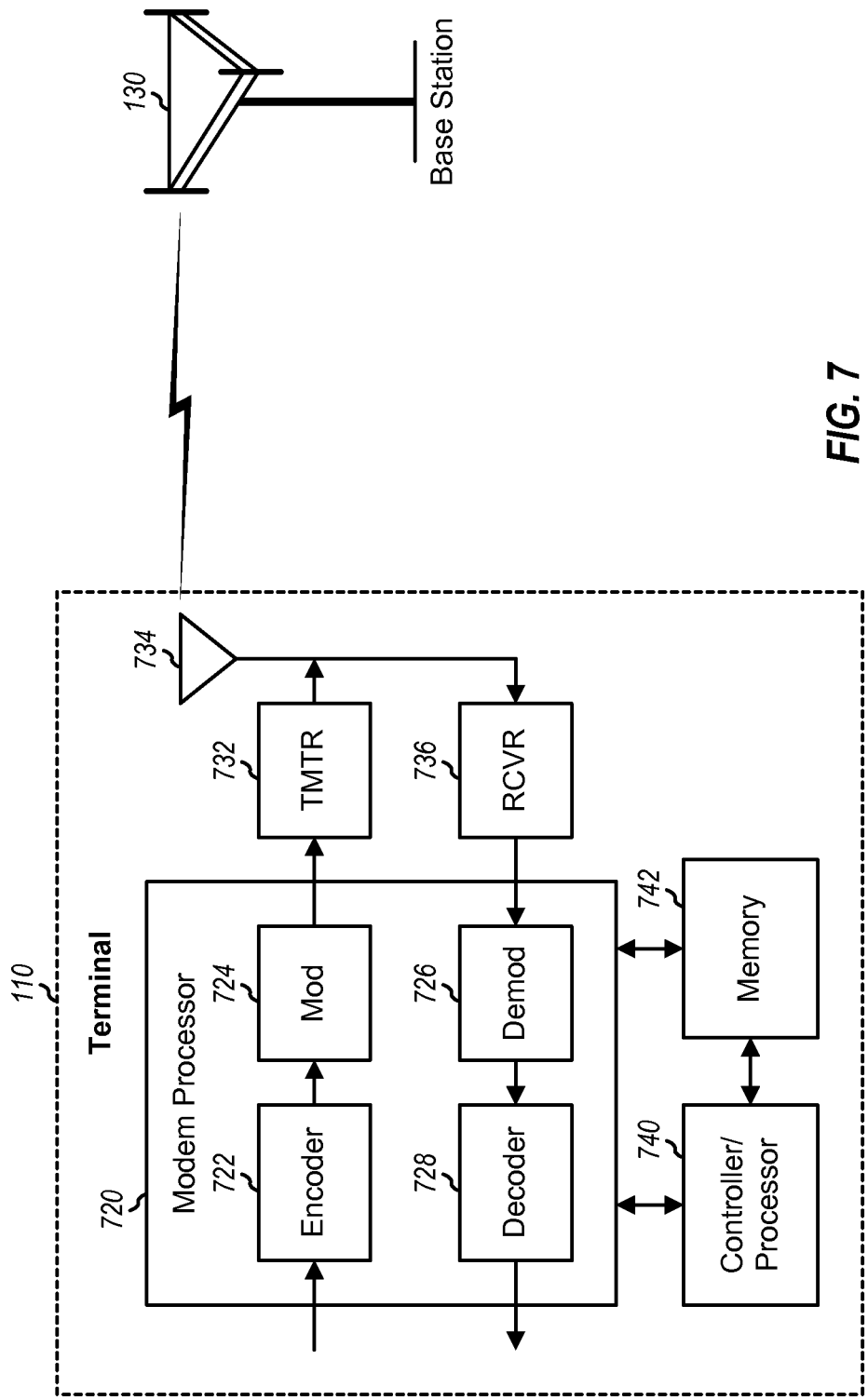
FIG. 7 shows a block diagram of the terminal.

FIG. 7 shows a block diagram of a design of terminal 110 in FIG. 1. On the reverse link (or uplink), data and signaling to be sent by terminal 110 are processed (e.g., formatted, encoded, and interleaved) by an encoder 722 and further processed (e.g., modulated, channelized, and scrambled) by a modulator (Mod) 724 in accordance with an applicable radio technology (e.g., HRPD, CDMA2000 1X, W-CDMA, GSM, etc.) to generate output chips. A transmitter (TMTR) 732 then conditions (e.g., converts to analog, filters, amplifies, and frequency upconverts) the output chips and generates a reverse link signal, which is transmitted via an antenna 734.

On the forward link (or downlink), antenna 734 receives forward link signals transmitted by the base stations and provides a received signal. A receiver (RCVR) 736 conditions (e.g., filters, amplifies, frequency downconverts, and digitizes) the received signal and provides samples. A demodulator (Demod) 726 processes (e.g., descrambles, channelizes, and demodulates) the samples and provides symbol estimates. A decoder 728 further processes (e.g., deinterleaves and decodes) the symbol estimates and provides decoded data. Encoder 722, modulator 724, demodulator 726, and decoder 728 may be implemented by a modem processor 720. These units perform processing in accordance with the radio technology (e.g., HRPD, CDMA2000 1X, W-CDMA, GSM, etc.) used by the system with which terminal 110 communicates.

A controller/processor 740 controls the operation at terminal 110. Controller/processor 740 may also implement process 400 in FIGS. 4 through 5C, process 600 in FIG. 6, and/or other processes to route data via lower layers. A memory 742 stores data and program codes for terminal 110. Memory 742 may store information for the lower layer paths, e.g., information for activated and suspended flows, connected and disconnected links, the available channels, etc.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 742 in FIG. 7) and executed by a processor (e.g., processor 740). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
    a radio transceiver that provides a single radio connection for a wireless device, wherein the wireless device is a terminal in a wireless system;
    a processor configured to:
        receive a packet to be sent on the single radio connection;
        determine a plurality of lower layer paths on the wireless device and available for routing data within the wireless device, each lower layer path being a path for routing the data via at least one layer of a protocol stack at the wireless device;
        select a most preferred lower layer path for the packet from among the plurality of lower layer paths available within the wireless device;
        send the packet via the selected lower layer path and the single radio connection; and
        set up a highest precedence lower layer path for the packet if the highest precedence lower layer path is not one of the plurality of lower layer paths available within the wireless device; and
    a memory coupled to the processor,
    wherein the plurality of lower layer paths have different characteristics and wherein each lower layer path of the plurality of lower layer paths is mapped to the single radio connection via the radio transceiver.

2. The apparatus of claim 1, wherein each of the plurality of lower layer paths carries the data through the link layer and the physical layer in the protocol stack.

3. The apparatus of claim 1, wherein each of the plurality of lower layer paths comprises a flow for packets, a link at a link layer, and a channel at a physical layer.

4. The apparatus of claim 3, wherein the link corresponds to a Radio Link Protocol (RLP) instance in High Rate Packet Data (HRPD).

5. The apparatus of claim 1, wherein the processor is further configured to:
    select a lower layer path with a quality of service (QoS) flow if the lower layer path with the QoS flow is specified for the packet and is available, and
    select a lower layer path with a best effort flow if the lower layer path with the QoS flow is not specified for the packet or is not available.

6. The apparatus of claim 1, wherein the processor is further configured to:
    filter the packet with at least one packet filter for at least one quality of service (QoS) flow, and
    select a lower layer path with a QoS flow as the most preferred lower layer path for the packet if the packet matches a packet filter for the QoS flow.

7. The apparatus of claim 6, wherein the processor is further configured to send the packet on a traffic channel if the QoS flow is activated and a link for the selected lower layer path is connected.

8. The apparatus of claim 7, wherein the processor is further configured to send the packet on a signaling channel if the QoS flow is activated, the link for the selected lower layer path is not connected, and the signaling channel is available and capable of carrying the packet.

9. The apparatus of claim 1, wherein the processor is further configured to:
    filter the packet with at least one packet filter for at least one best effort flow, and
    select a lower layer path with a best effort flow as the most preferred lower layer path for the packet if the packet matches a packet filter for the best effort flow.

10. The apparatus of claim 9, wherein the processor is further configured to send the packet on a traffic channel if the best effort flow is activated and a link for the selected lower layer path is connected.

11. The apparatus of claim 10, wherein the processor is further configured to send the packet on a signaling channel if the best effort flow is activated, the link for the selected lower layer path is not connected, and the signaling channel is available and capable of carrying the packet.

12. The apparatus of claim 1, wherein the plurality of lower layer paths are arranged in an order of preference based on a treatment of packets, wherein a quality of service (QoS) flow has a higher preference than a best effort flow.

13. The apparatus of claim 1, wherein the plurality of lower layer paths are arranged in an order of preference based on protocols used at a link layer.

14. The apparatus of claim 1, wherein the plurality of lower layer paths are arranged in an order of preference based on channel types at a physical layer.

15. A method comprising:
    receiving a packet to send at a wireless device;
    determining a plurality of lower layer paths on the wireless device and available for routing data within the wireless device, each lower layer path being a path for routing the data via at least one layer of a protocol stack at the wireless device, the plurality of lower layer paths having different characteristics;
    selecting a most preferred lower layer path for the packet from among the plurality of lower layer paths available within the wireless device;
    sending the packet via the selected lower layer path and through a single radio connection maintained by the wireless device; and setting up a highest precedence lower layer path for the packet if the highest precedence lower layer path is not one of the plurality of lower layer paths available within the wireless device;

wherein each lower layer path of the plurality of lower layer paths is mapped to the single radio connection through a single transceiver that maintains the radio connection at the wireless device, and wherein the wireless device is a terminal in a wireless system.

16. The method of claim 15, wherein the selecting the most preferred lower layer path for the packet comprises:
   selecting a lower layer path with a quality of service (QoS) flow if the lower layer path with the QoS flow is specified for the packet and is available, and
   selecting a lower layer path with a best effort flow if the lower layer path with the QoS flow is not specified for the packet or is not available.

17. The method of claim 15, wherein the selecting the most preferred lower layer path for the packet comprises:
   filtering the packet with at least one packet filter for at least one quality of service (QoS) flow, and
   selecting a lower layer path with a QoS flow as the most preferred lower layer path for the packet if the packet matches a packet filter for the QoS flow.

18. The method of claim 15, wherein the selecting the most preferred lower layer path for the packet comprises:
   filtering the packet with at least one packet filter for at least one best effort flow, and
   selecting a lower layer path with a best effort flow as the most preferred lower layer path for the packet if the packet matches a packet filter for the best effort flow.

19. An apparatus comprising:
   means for receiving a packet to send at a wireless device;
   means for determining a plurality of lower layer paths on the wireless device and available for routing data within the wireless device, each lower layer path being a path for routing the data via at least one layer of a protocol stack at the wireless device, the plurality of lower layer paths having different characteristics;
   means for selecting a most preferred lower layer path for the packet from among the plurality of lower layer paths available within the wireless device;
   means for sending the packet via the selected lower layer path and through a single radio connection maintained by the wireless device; and
   means for setting up a highest precedence lower layer path for the packet if the highest precedence lower layer path is not one of the plurality of lower layer paths available within the wireless device;
   wherein each lower layer path of the plurality of lower layer paths is mapped to the single radio connection through a single transceiver that maintains the single radio connection at the wireless device, and wherein the wireless device is a terminal in a wireless system.

20. The apparatus of claim 19, wherein the means for selecting the most preferred lower layer path for the packet comprises:
   means for selecting a lower layer path with a quality of service (QoS) flow if the lower layer path with the QoS flow is specified for the packet and is available, and
   means for selecting a lower layer path with a best effort flow if the lower layer path with the QoS flow is not specified for the packet or is not available.

21. The apparatus of claim 19, wherein the means for selecting the most preferred lower layer path for the packet comprises:
   means for filtering the packet with at least one packet filter for at least one quality of service (QoS) flow, and
   means for selecting a lower layer path with a QoS flow as the most preferred lower layer path for the packet if the packet matches a packet filter for the QoS flow.

22. The apparatus of claim 19, wherein the means for selecting the most preferred lower layer path for the packet comprises:
   means for filtering the packet with at least one packet filter for at least one best effort flow, and
   means for selecting a lower layer path with a best effort flow as the most preferred lower layer path for the packet if the packet matches a packet filter for the best effort flow.

23. A non-transitory processor-readable medium encoded with a computer program comprising instructions to:
   receive a packet to send at a wireless device;
   determine a plurality of lower layer paths on the wireless device and available for routing data within the wireless device, each lower layer path being a path for routing the data via at least one layer of a protocol stack at the wireless device, the plurality of lower layer paths having different characteristics;
   select a most preferred lower layer path for the packet from among the plurality of lower layer paths available within the wireless device;
   send the packet via the selected lower layer path and through a single radio connection maintained by the wireless device; and
   set up a highest precedence lower layer path for the packet if the highest precedence lower layer path is not one of the plurality of lower layer paths available within the wireless device;
   wherein each lower layer path of the plurality of lower layer paths is mapped to the single radio connection through a single transceiver that maintains the single radio connection at the wireless device, and wherein the wireless device is a terminal in a wireless system.

24. The processor-readable medium of claim 23, the computer program further comprising instructions to:
   select a lower layer path with a quality of service (QoS) flow if specified for the packet and available, and
   select a lower layer path with a best effort flow if the lower layer path with the QoS flow is not specified for the packet or is not available.

25. The processor-readable medium of claim 23, the computer program further comprising instructions to:
   filter the packet with at least one packet filter for at least one quality of service (QoS) flow, and
   select a lower layer path with a QoS flow as the most preferred lower layer path for the packet if the packet matches a packet filter for the QoS flow.

26. The processor-readable medium of claim 23, the computer program further comprising instructions to:
   filter the packet with at least one packet filter for at least one best effort flow, and
   select a lower layer path with a best effort flow as the most preferred lower layer path for the packet if the packet matches a packet filter for the best effort flow.

* * * * *